2,855,521

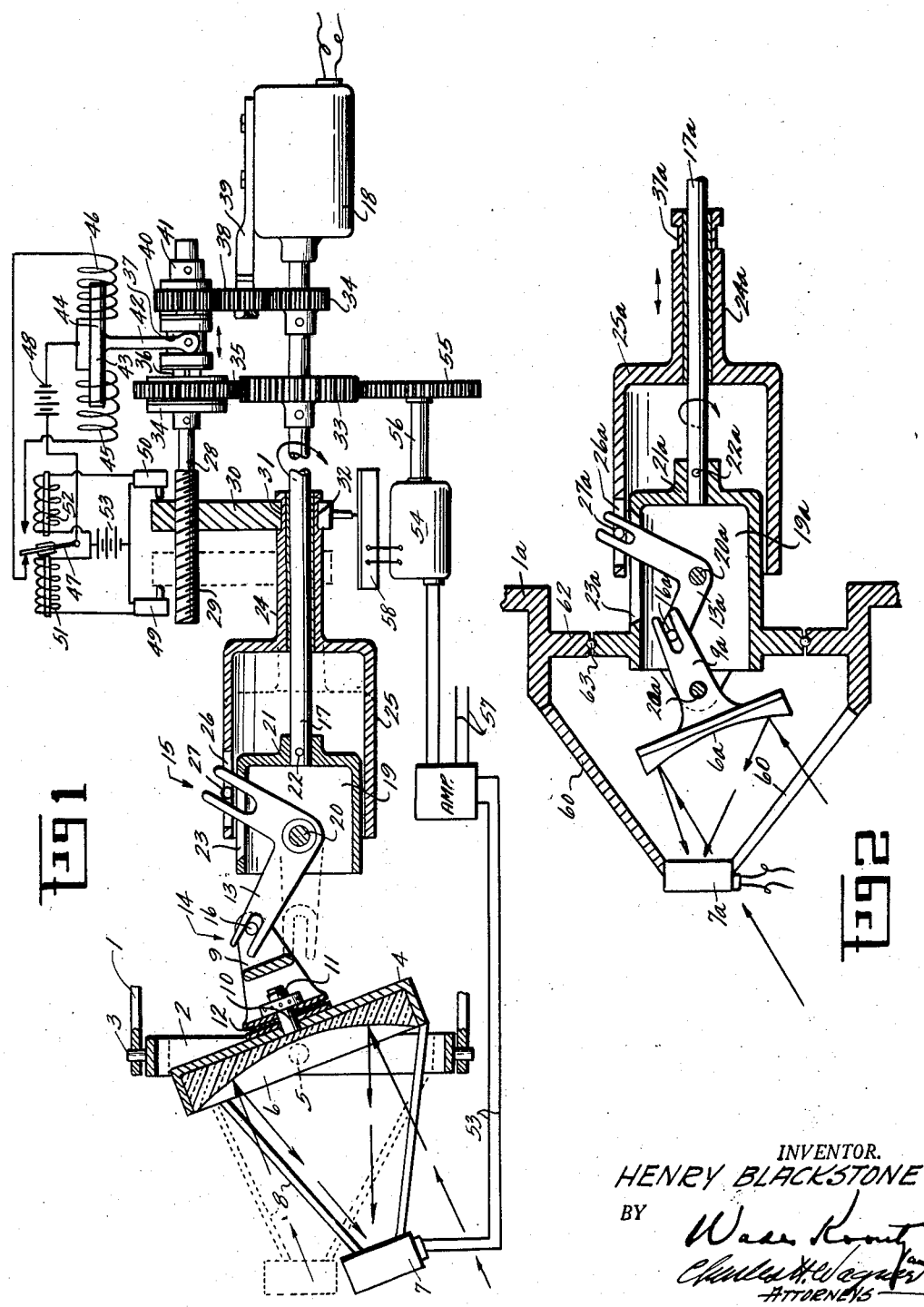

APPARATUS FOR PRODUCING A CONICAL SCAN OF AUTOMATICALLY VARYING APEX ANGLE

Henry Blackstone, Roslyn, N. Y., assignor, by mesne assignments, to the United States of America as represented by the Secretary of the United States Air Force Application September 4, 1952, Serial No. 307,861

10 Claims. (Cl. 250—83.3)

This invention relates to radar and infrared radiation scanning apparatus and more particularly to means for producing a non-rotating, nutating motion in a directionally responsive supporting element and automatically varying the angle of the scanning axis relative to a central scanning axis between given limits, whereby the scanned field included by said limits is continuously spirally scanned, radially inwardly and radially outwardly, in which the radiation sensitive element is fixedly wired to a relatively stationary receiving element and the nutating support for the sensitive element is not rotated, the sensitive element being rigidly supported, as by tripod legs relative a parabolic non-rotatable concave reflector mirror frame carried in a two axis gimbal suspension to permit adjustment of the optical axis of the mirror axis to any given angular inclination in any direction. Nutation is imparted to the reflector case or frame by what is similar to a swash plate which forms part of a continuously rotating mechanism driven by a motor and is provided with means driven by the motor to continuously tilt the swash plate device back and forth to adjust the mirror 6 through an axis of about 20 degrees and simultaneously adjust the mirror in a transverse direction at a different rate, thereby producing a continuous spiral scan outwardly and inwardly from the central scanning axis.

Other objects and advantages of the invention will become apparent from the accompanying specification and drawing in which like reference characters refer to like parts in the several figures.

Fig. 1 is a fragmentary vertical sectional simplified diagrammatic view of a radar, or infrared search or scanning apparatus incorporating my invention.

Fig. 2 is a fragmentary sectional view of a slightly modified search or scanning head in which the radiation sensitive element or bolometer is held stationary relative to the nutating mirror and the spiral scanning reflector and its adjusting mechanism.

Referring to Fig. 1 of the drawings, the reference numeral 1 denotes a support in or on which my improved apparatus is mounted, such as a dirigible support, or an aircraft, or a "guided missile." The support 1 carries a gimbal frame 2, pivoted on one axis at 3, in which is mounted, on a transverse intersecting axis, a second gimbal frame 4 pivoted on the gimbal frame 2, at 5. The gimbal frame 4 carries a parabolic reflector or concave mirror 6 having a bolometer or infrared radiation sensitive element 7 rigidly supported on the frame 4 by the supporting arms or a spider frame 8 converging outwardly from the frame 4 so as to position the "sensitive" element at the focal point of the mirror 6. At the center of the back of the mirror frame 4 and preferably rotatably mounted thereon is an actuating arm 9. The arm 9 as shown in Fig. 1 is mounted on a shaft 10 projecting rearwardly and integrally from the rear face of the reflector frame 4 on an axis coincident with the optical axes of the reflector 6 and bolometer 7 passing through the intersecting axis 3 and 5 of the gimbal frames 2 and 4, being retained in place in rotative position on the shaft 10 by a nut 11 with anti-friction ball bearings and a race 12 therebetween. The outer or rear end portion of the reflector actuating arm 9 is bifurcated to snugly receive therebetween one end of an adjusting bell crank lever 13, the bell crank lever 13 being preferably slotted at its opposite free extremities as indicated at 14 and 15, with the slot 14 snugly receiving a cross pin 16 extending between the side or cheek plates of the actuating arm 9, this connection constituting means for both tilting arm 9 and mirror 6 and rotating the arm 9 on the shaft 10.

The bell crank lever 13 is pivotally connected to a drive shaft 17 mounted on the support 1 with its rotative axis extending through the intersecting axes of the gimbal frames 2 and 4 and in alignment with the central scanning axis of the support. The shaft 17 is uniformly driven by power means such as a motor 18 and fixed against axial displacement by end thrust bearings (not shown).

The mounting for the bell crank lever 13, as shown, comprises an open ended tubular or cylindrical member 19 having suitable diametrically opposite bearing sockets receiving the opposite ends of the bell crank lever pivot member or shaft 20 therein, the pivotal axis of the bell crank lever being disposed to intersect the rotative axis of the shaft 17, perpendicularly thereto, the tubular member 19 being formed with a central hub portion 21 secured on the drive shaft 17 by a pin 22. The enlarged hollow cylindrical portion 19 is longitudinally slotted as indicated at 23 to receive the slotted laterally extending bell crank extremity or arm 15 therethrough.

Axially slidable on the drive shaft 17 is a hub or sleeve member 24 having an enlarged forwardly projecting cylindrical head portion 25 telescopically movable over the cylindrical head portion 19 and provided with a slot 26 longitudinal in radial register with the slot 23 with the sides of the bell crank lever arm slidably engaging the sides of the slot. A cross bar or pin 27 extends across the slot 26 intermediate its ends and is received in the slotted end portion 15 of the laterally extending arm of the bell crank lever 13.

Axial movement of sleeve member 24 in either direction therefore rocks the bell crank lever 13 to adjust the tilt angle of the reflector 6 the degree of tilt of the mirror being determined by the longitudinal adjustment of the sleeve member 24 on the drive shaft 17 while the angular position of the tilt plane of the bell crank lever 13 and the mirror 6 relative to the central scanning axis is determined by the rotative adjustment of the drive shaft 17.

Axial adjustment of the sleeve member 24 in opposite directions is produced incident to and simultaneously with the rotative movement of the shaft 17 through the instrumentalities of a reverse gear actuating means including a pair of electromechanical friction clutches and circuit connected controlling limit switches. A screw shaft 28 is rotatable journalled on the support 1 in parallel spaced relation to the drive shaft 17, the shaft 28 having a threaded portion 29. An actuating means in the form of an arm 30 is threadably received thereon having one end portion bifurcated at 31 to form a shifter yoke disposed in actuating engagement with an annular channel 32 formed in the sleeve member 24.

The shaft 17 carries spaced pinion gears 33 and 34 fixed thereon, the gear 33 of the reverse gear train meshing with a reverse gear 35 freely journalled on the screw shaft 28 between a fixed flanged collar 34 and the friction clutch face 36 of a shiftable friction clutch member 37 splined on the screw shaft 28. The other gear 34 on the screw shaft meshes with an idler gear 38 journalled on a fixed bracket 39 on the support, the gear 38 meshing with a second gear 40 loosely journalled on the screw shaft 28 between a second flanged collar 41 fixed on the shaft 28 and the second friction face on the splined friction clutch element 37. Gears 33 and 35 form one gear train for rotating the actuating shaft 28 in one direction while gears 34, 38 and 40 form an opposite gear train for actuating the screw shaft 28 in the opposite direction. A clutch shifter yoke 42 engages an annular groove in the splined friction clutch member 37 for shifting the same in opposite directions to couple gear train 33, 35 or gear train 34, 38 and 40 to the screw shaft 28 and rotate the screw shaft in opposite directions.

The clutch shifter yoke member 42 is solenoid operated and comprises a stem or arm portion fixed to the armatures 43 and 44 of the solenoid coils 45 and 46.

A double pole relay device 47 provides means for closing one or the other of the provided energizing circuits to the solenoid coils 45 and 46 and is energized by a suitable circuit from an electrical power source 48. Limit switches 49 and 50 are provided at each end in the path of movement of the shifter member 30 for energizing respectively the magnets 51 and 52 through separate circuits energized by the battery or electrical power source 53. The positions of the limit switches are such as to cause reversal of the direction of rotation of the screw shaft 28 when the mirror axis has tilted to a predetermined angle from either side of the axis of the main drive shaft 17, or more accurately expressed, when the line of scanning axis becomes tilted beyond a predetermined degree from the central scanning axis. The pitch of the threads on the threaded portion 29 are such that the axis of the scanning mirror is tilted about one degree of arc for each rotation of the drive shaft 17, also the field of scan of the mirror and bolometer is such as to preferably cover about one degree of arc.

In the operation of the scanning apparatus, starting with the scanning head in its central position on the central scanning axis as shown in dotted lines in Fig. 1 the motor 18 rotates the drive shaft 17, and the bell crank lever 13 bodily turning therewith, rotates the arm 9 on its supporting axle or shaft 10, rotation of the arm 9 being communicated thereto by its cooperating engagement with the pin 16 and the adjacent edges and sides of the cheek plates of the arm 9 with the slot 14 and opposite side faces the bell crank lever arm 9. As the drive shaft 17 rotates, the gearing 34, 38 and 40 and engaged clutch 37 actuates the threaded shank 29 to move the actuating member 30 toward the limit switch 50, each rotation of the shafts 17 and 28 shifting the sleeve member 24 and the pin 15 to the right, tilting the bell crank, which during each turn of the shaft through the cooperating lateral arm 19 tilts the axis of the mirror 6 one degree. As the drive shaft 17 rotates its cooperating connected parts rotate with it and tilt the arm 9 toward the maximum tilt position in one direction, as shown in full lines in Fig. 1.

Since the bell crank lever 13 is gradually tilted back and forth at a slow uniform rate and simultaneously rotated on the central scanning axis by the shaft 17 the axis of the reflector traverses a spiral search path. The field of scan of the reflector 6 is small, about 1 degree of arc. Radiation from a target located in this conical field of scan will therefore strike the mirror 6 and be concentrated on the bolometer 7, each time the nutating spiral scan passes across the target and the signal will be conveyed to a suitable signal network, not shown, by the circuit wires 53. A potentiometer or similar device indicated at 54 may be driven from the gear 33 through a gear 55 on the potentiometer adjusting shaft 56 and signals therefrom are conveyed by wires 57 to the signal network to determine angular position of the target in the quadrants around the scan axis where the target is located. The potentiometer 54 may include potentiometer means to determine the off axis position of the target in the usual manner as in radar search apparatus or by a second potentiometer 58 the slider of which is actuated by the shifter yoke member 30. During the spiral path or rotary nutation of the scanning axis the adjustment of the potentiometers locate the position of the scan axis as it crosses the target and receives the target signal. Since the position of the target relative to the central scan axis is thus located the target pulse signal from the bolometer 7 can be used to operate a steering mechanism (not shown) to direct the supporting structure toward the target, if so desired, or to locate the position of the target on an oscilloscope in the conventional manner.

Figure 2 shows a slightly modified arrangement of the scanning head in which the bolometer or infrared signal pickup means is maintained fixed on the central scanning axis and the mirror is not gimballed shown as in Figure 1 but has a combined rotary and tilting motion the bolometer being located substantially at the focal point of the reflector 6a. Parts shown in figure similar to those in Fig. 1 will be given similar reference characters to those shown in Fig. 1 but suffixed by the letter (a), The supporting frame 1a as shown in Fig. 2 is provided with converging rod supports 60 rigidly supporting the infrared responsive cell or bolometer 7a on the central scanning axis of a main support 1a such as an aircraft, guided missile, etc., and an annular flange 62 projecting inwardly supports the hollow cylindrical head member 19a at its front end on an annular ball race or bearing 63 for rotation on the central scanning axis and against fore and aft or axial displacement. The drive shaft 17a is fixed in the hub portion 21a of the head member 19a and rotates the member 19a in a manner similar to the member 19 in Figure 1. The actuating arm 9a pivoted at 20a on an axis transverse to the head 19a and provides an oscillatable support for the concave mirror or reflector member 6a fixed thereto with its focal point substantially in the bolometer device 7a. The arm 9a is oscillated and rotated by the bell crank 13a and cylindrical head 25a carried by the actuating sleeve 24a by means similar to that shown in Fig. 1 and further description or amplification of such means is not thought to be necessary. As the drive shaft 17a is rotated the sleeve 24a is axially shifted back and forth to cause the optical axis of the reflector 6a to describe a narrow spiral path similar to the optical axis of the mirror 6 in Fig. 1. The angle of incidence of the mirror 6a relative to the stationary bolometer 7a requires that the mirror 6a be tilted only half the distance of the mirror 6 in Figure 1 to obtain the same field of scan. Divorcing the bolometer or sensitive radiation pickup element from the tiltable mirror also eliminates certain vibrations from being communicated to the bolometer, providing a somewhat more satisfactory mounting arrangement than the form in Fig. 1 in which the bolometer 7 and the mirror 6 tilt and move together. In both instances, however, because the bolometer device is fixed against rotation, direct and positive wired connections can be made between the signal pickup bolometer 7 or 7a and the signal amplifiers and analogous apparatus. The noise produced in the arrangement shown in Fig. 2 is of such a low background level as to produce substantially no impairment of functioning of the sensitive element, in spite of the high speeds of nutation and variations in the angle of nutation.

Having described my invention in connection diagrammatic illustration, as shown in Figures 1 and 2, for purposes of illustration what I claim as new and desire to secure by Letters Patent is set forth in the accompanying claims.

1. In a scanning mechanism for radiation responsive elements, a support having a central scanning axis, a non-rotary scanning head mounted on said support for tilting displacements about two mutually perpendicular axes intersecting the central scanning axis, power means carried by the support, actuating means connected between the scanning head and the power means for tilting the scanning head back and forth across the scanning axis about one of said tilt axes at a predetermined rate, and actuating means connected intermediate the power means and the first mentioned actuating means for simultaneously tilting the scanning head back and forth across the scanning axis about the other of said axes at different rate.

2. In a spiral scanning mechanism for radiation responsive elements, a support having a central scanning axis, a scanning head having a field of scan of approximately one degree of arc, gimbal means carried by the support mounting said scanning head thereon for tilting displacements about mutually perpendicular axes intersecting the said central scanning axis substantially perpendicularly thereto to provide for non-rotary tilting displacements of said scanning head in excess of 10° at each side of the central scanning axes in any direction, a drive shaft rotatable journalled in alignment with the central scanning axis, a bell crank lever tiltably fulcrumed at one end of the drive shaft with one arm of the bell crank lever being disposed to rock back across the central scanning axis from an axes intersecting the central scanning axis, the bell crank lever being rotatable bodily with the shaft on the central scanning axis, an actuating arm connected to the scanning head for tilt actuation thereof connected with the said other arm of the bell crank lever at one side of the central scanning axis for converting combined bodily rotative and tilting motion of the bell crank to simultaneous tilting motion of the scanning head about both of said tilt axes during rotation of the shaft, power means carried by the support and connected to the said shaft for uniformly rotating the same on the scanning axis to rotate the bell crank bodily on the central scanning axis and a second actuating means operatively connected between the power means and the said other arm of the bell crank lever for rocking the bell crank during bodily rotation thereof to rock the scanning head about the second of the said axes constructed and arranged to tilt the scanning head axes through substantially one degree of arc relative to the central scanning axis during each bodily rotation of the said bell crank lever on the central scanning axis.

3. In a spiral scanning mechanism for radiation sensitive pickup mechanisms, a support having a central scanning axis, a scanning head gimbaled on the support for tilting displacement about mutually perpendicular intersecting axes intersecting the central scanning axis, said scanning head comprising a concave reflector and a bolometer including a radiation sensitive element located substantially at the focal point on the reflector, an actuating arm connected at the back of the reflector and extending rearwardly thereof terminating in an actuating end disposed in alignment with the optical axis of the reflector, actuating means for simultaneous rocking and rotating of the said arm comprising a drive shaft and a bell crank lever pivotally carried thereby having a fulcrum axis intersecting the central scanning perpendicular thereto with one arm of the bell crank lever being disposed in a plane extending through the central scanning axis and the other arm of the bell crank lever projecting laterally to one side of the central scanning axis, said drive shaft being rotatable on the support in concentric alignment with the central scanning axis and retained against axial movement, a sleeve member axially shiftable on the drive shaft, a positive actuating connection between the said other arm of the bell crank lever and the sleeve member for rocking the bell crank lever in opposite directions incident to axial movement of the sleeve member in opposite directions on the drive shaft, a screw shaft rotatably in spaced parallel relation to the drive shaft, sleeve actuating means threadably carried on the screw shaft having an actuating connection with the sleeve member for shifting the sleeve member in one direction to tilt the bell crank lever in one direction during rotation of the screw shaft in one direction and shiftable in the opposite direction incident to reverse rotation of the screw shaft to tilt the bell crank lever in the opposite direction, reverse drive means selectively operable between the drive shaft and the screw shaft for selectively rotating the screw shaft in either of said directions during rotation of the drive shaft in one direction and means actuated by said sleeve actuating means for reversing the reverse drive means incident to a predetermined movement of the sleeve actuating member in either direction on the screw shaft.

4. In a spiral scanning device for radiation sensitive elements, a support having a central scanning axis, a concave mirror having a scanning axis for reflecting radiation from a distant target to its focal point, a radiation sensitive element at the focal point of said mirror, gimbal means mounting said mirror for tilting displacements in mutually intersecting perpendicular planes extending through the central scanning axis, power means, a drive shaft means connected to the power means to be uniformly driven thereby and having a longitudinal axis; an angle lever pivotally carried by the drive shaft means for tilt displacements in a plane extending through the longitudinal axis of the drive shaft means, said angle lever having an actuating end tiltable back and forth in the last mentioned plane at opposite sides of the longitudinal axis of said drive shaft means and simultaneously rotatable bodily with the said drive shaft means, angle lever tilting means driven from said drive shaft, means connected to said angle lever for rocking the angle lever through a predetermined angle in one direction during each rotation of the drive shaft means, reversing means intermediate the drive shaft means and the angle lever tilting means for automatically reversing the tilt direction of movement of the angle lever when the angle lever is tilted beyond a predetermined angle in either direction from said longitudinal axis, and a positive actuating connection between the concave mirror and the actuating end of the angle lever for tilting the scanning axis of the mirror in a spiral path around and through the central scanning axis during simultaneous bodily rotation and tilting movement of the angle lever.

5. In a spiral nutating scanning device for an infrared radiation sensitive element, power means, a drive shaft, means connected thereto for uniform rotation about a longitudinal axis, an angle lever pivotally carried by said drive shaft means for tilt displacements in a plane through the longitudinal axis of the drive shaft means, said angle lever having an actuating end tiltable back and forth in the last mentioned plane to opposite sides of the longitudinal axis of said drive shaft means, angle lever tilting means driven by the said drive shaft means operatively and positively connected to said angle lever for rocking the angle lever through a predetermined angle in one direction during each rotation of the drive shaft means in one direction, reversing means intermediate the drive shaft means and the angle lever, tilting means for automatically reversing the tilt direction of movement of the angle lever when the angle lever is tilted beyond a predetermined angle in either direction from said longitudinal axis during continuous rotation of the drive shaft means in the same direction, a scanning head, a positive actuating connection between the actuating end of the angle lever and the scanning head for tilting the scanning head about a central scanning axis during bodily rotation of the angle lever by the drive shaft means and simultaneously positively tilting the scanning head in a plane fixed relative to the tilt plane of the angle lever during bodily rotative and tilting movement of the angle lever, said scanning head including a concave reflector having a scanning axis and a focal point, and an infrared radiation pickup element disposed substantially at the focal point of the reflector to receive concentrated infrared radiation from a distant infrared radiating target, reflected by the reflector toward said focal point.

6. Apparatus as claimed in claim 5 in which the concave reflector is gimballed for non-rotary tilt displacement in any direction relative to the central scanning axis and an actuating arm in swivelly connected at one end to the reflector to extend rearwardly in alignment with the optical axis of the reflector with its opposite end interconnected to the extremity of the angle lever for rocking the reflector and reflector carried arm incident to tilting movements of the angle lever and for rotating the reflector carried arm incident to bodily rotation of the angle lever about the said longitudinal axis.

7. Apparatus as claimed in claim 5 in which the reflector carries an actuating arm connected at one end to and projecting rearwardly from the rear of the reflector in alignment with the optical axis of the reflector, pivot means for supporting the reflector and actuating arm for tilt displacement in the plane of tilt of the angle lever, a positive actuating connection between said rearwardly extending arm having its rear end interconnected to the free end of the angle lever for positively rocking said rearwardly extending arm and the reflector in the plane of tilt of the angle lever during tilt movements of the actuating arm and positively tilting the reflector transversely incident to bodily rotation of the angle lever about said longitudinal axis.

8. Apparatus as claimed in claim 7 including means for rigidly supporting the infrared sensitive element substantially at the focal point of the reflector during movements of said reflector by said angle lever.

9. In a rotary nutating infrared scanning head for infrared radiation sensitive elements, a support having a central scanning axis, a drive shaft journalled on the support for non-axial rotative movement coincident with the scanning axis, a bell crank lever pivotedly carried by the drive shaft on an axis intersecting the rotative axis of the shaft perpendicularly, said bell crank lever having an actuating arm extending forwardly for movement through the central scanning axis in a plane perpendicular to the bell crank pivot, the other arm of the bell crank extending laterally and terminating in an actuating end swingable in the last mentioned plane, a sleeve member axially shiftable on the drive shaft, an actuating connection between the sleeve member and the end of said other bell crank arm, a screw shaft rotatably journalled in spaced parallel relation to the drive shaft, screw shaft drive means between said drive shaft and the screw shaft for rotating the screw shaft in one direction, screw shaft reverse drive means between the drive shaft and the screw shaft for reversely rotating the screw shaft, shiftable clutch means for selectively engaging the screw shaft drive means or screw shaft reverse drive means with the screw shaft, a sleeve shifter arm threadably carried on the screw shaft having a free end connected to the sleeve for axial shifting thereof on the drive shaft, movement limiting means disposed in the path of movement of the sleeve shifter arm in either direction for engaging said clutch means to reverse the direction of rotation of the screw shaft, an infrared radiation pickup head including a concave mirror means mounted for tilting movements on an axis extending through the central scanning axis perpendicular thereto, a mirror actuating arm connected to the mirror means and extending rearward therefrom having an actuating end interconnecting the forward end of the first mentioned bell crank arm and movable in the plane of tilt of the first mentioned bell crank arm, and an infrared radiation sensitive pickup element mounted at the focal point of the mirror.

10. In a spiral scanning device for infrared radiation responsive elements, a support having a central scanning axis, a concave mirror carried by the support for universal tilting movements through the central scanning axes in mutually intersecting planes in any direction, power means carried by the support, drive shaft means carried by the support, means connecting the drive shaft means to the power means for rotation thereof in one direction, a tiltable actuator connected to the drive shaft for bodily rotation thereof in any tilted position on the central scanning axis, swivel means connecting the reflector to the tiltable actuator for corresponding tilt angle adjustment thereof, and reversible tilting means operable between the drive shaft means and the tiltable actuator for tilting the actuator back and forth during the bodily rotation thereof, whereby to cause the reflector optical axis to traverse a spiral path back and forth through the scanning axis, said reflector having a focal point and an infrared responsive element disposed at said focal point.

No references cited.